United States Patent [19]
Pühringer et al.

[11] 4,116,261
[45] Sep. 26, 1978

[54] CONTINUOUS CASTING PLANT STRAND GUIDING MEANS

[75] Inventors: Othmar Pühringer; Werner Scheurecker, both of Linz, Austria

[73] Assignee: Vereinigte Österreichische Eisen- und Stahlwerke - Alpine Montan Aktiengesellschaft, Linz, Austria

[21] Appl. No.: 750,194

[22] Filed: Dec. 13, 1976

[30] Foreign Application Priority Data

Dec. 17, 1975 [AT] Austria ................................ 9570/75

[51] Int. Cl.² ........................................ B22D 11/128
[52] U.S. Cl. ................................... 164/448; 72/237; 74/571 R
[58] Field of Search ................... 164/82, 282; 72/237, 72/244; 74/116, 211, 242.16, 570, 571 R; 29/116 R

[56] References Cited
U.S. PATENT DOCUMENTS

| | | | |
|---|---|---|---|
| 285,567 | 9/1883 | Carter | 72/237 |
| 614,864 | 11/1898 | Wright | 74/571 R |
| 1,157,378 | 10/1915 | Geer | 72/237 X |
| 2,774,263 | 12/1956 | Leufven | 72/248 X |
| 3,306,091 | 2/1967 | Bursk | 72/240 |
| 3,409,070 | 11/1968 | Ciochetto | 164/282 X |
| 3,691,810 | 9/1972 | Todenay | 72/244 |
| 4,007,822 | 2/1977 | Scheurecker | 164/282 X |

FOREIGN PATENT DOCUMENTS

| | | | |
|---|---|---|---|
| 2,275,264 | 1/1976 | France | 164/282 |
| 388,834 | 11/1973 | U.S.S.R. | 164/282 |

*Primary Examiner*—Francis S. Husar
*Assistant Examiner*—K. Y. Lin
*Attorney, Agent, or Firm*—Brumbaugh, Graves, Donohue & Raymond

[57] ABSTRACT

A continuous casting plant strand guiding means with rollers whose axes are mounted in roller carriers by means of eccentric bushings. Upon turning the eccentric bushings the distance between oppositely arranged rollers can be changed.

4 Claims, 6 Drawing Figures

CONTINUOUS CASTING PLANT STRAND GUIDING MEANS

BACKGROUND OF THE INVENTION

This invention relates to a strand guiding means for a continuous plant, which strand guiding means comprises oppositely arranged rollers, preferably rollers composed of a plurality of parts, that support and guide the strand. The stationary axes or driven shafts of the rollers are supported by roller carriers and are secured to these carriers by holding means.

In the usual continuous casting plants, the rollers defining the gap through which the casting is guided, are mounted on roller carriers and these roller carriers are adjustable to a certain distance relative to one another. However, it may be necessary, in particular in the case of rollers composed of a plurality of parts, to adjust individual rollers relative to their neighbouring rollers, independently of an adjustment of the roller carriers. Such individual adjustment may be required whenever a strand guiding roller does not occupy its pre-determined position because of faulty construction or positioning inaccuracies that occur whenever a roller is exchanged after prolonged use. Due to the wear of the bearings and of the roller surfaces, neighbouring rollers eventually lie on a strand guiding path which corresponds to a casting gap wider than the pre-determined casting gap. A newly inserted roller would form a smaller casting gap and, in order to protect the newly inserted roller from overload and the hot strand from unnecessary deformations that would lead to a deterioration in quality, it should be possible to adjust the roller to the position of its neighbouring rollers that have already been subjected to wear.

It may, moreover, be necessary to adjust the casting gap to be slightly conical along the strand guiding means, i.e. to slightly reduce the distance between oppositely, subsequently arranged rollers, without adjusting the roller carriers of the construction as such.

SUMMARY OF THE INVENTION

These objects of the invention are achieved in that the axes of the rollers are mounted in the roller carriers by means of eccentric bushings, the distance between oppositely arranged rollers being changeable by turning the bushings.

For achieving a precise adjustment of the distance between oppositely arranged rollers, the eccentric bushings preferably have the form of circular cylinders with eccentric bores for accommodating the axes or shafts of the rollers.

According to a preferred embodiment, the eccentric bushings have the form of prisms of a polygon-like cross section with eccentric bores for accommodating the axes or shafts of the rollers.

Advantageously, the eccentric bushings are secured against rotation relative to the axis, preferably by means of an adapter sleeve penetrating the eccentric bushing and the axis. In this manner, all the eccentric bushings of one roller can simultaneously be rotated by turning the axis.

In such a construction, the eccentric bushings are suitably connected with the holding means and rotatable thereby.

BRIEF DESCRIPTION OF THE DRAWINGS

The invention shall now be explained in greater detail by way of two examples with reference to the accompanying drawings, wherein.

DESCRIPTION OF EXEMPLARY EMBODIMENTS

Figure 1:
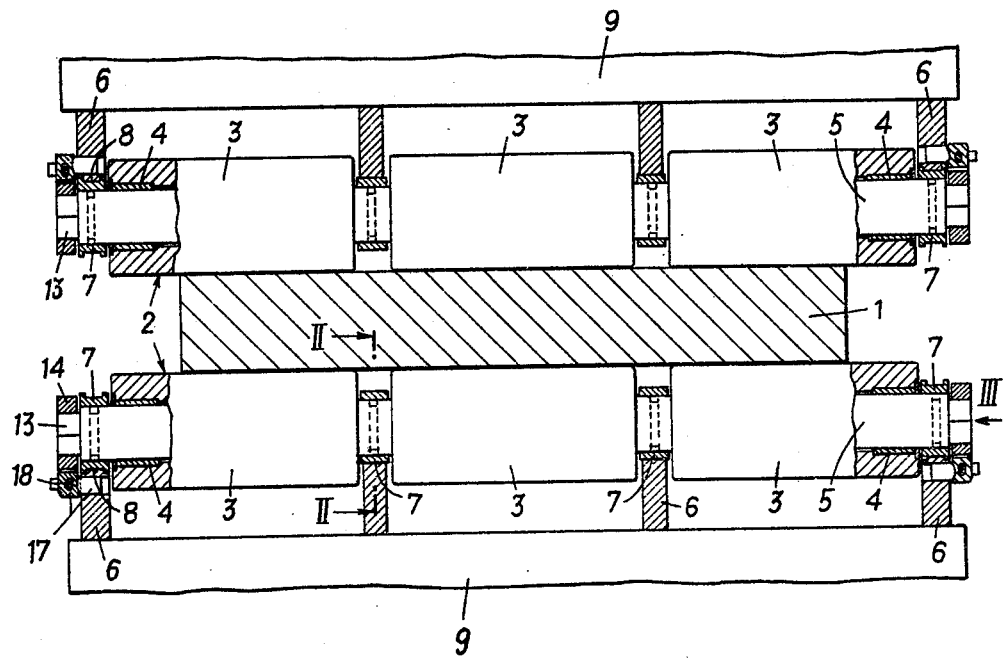
FIG. 1 is a cross section of the strand guiding means with the strand guiding rollers partly in section.

A cast strand 1 is guided between rollers 2 and is supported by them. Each roller 2 is comprised of roller bodies 3 which are rotatably mounted on a stationary axis 5 by slide or rolling bearings 4. At its ends and between the roller bodies, the axis 5 is supported in roller carriers 6. More particularly, the axis is surrounded by eccentric bushings 7 at the supporting places, which eccentric bushings are inserted in correspondingly designed receiving pockets 8 of the roller carriers 6. The roller carriers 6 extend in the longitudinal direction of the strand guiding means and serve for accommodating a number of rollers arranged side by side. The roller carriers 6 are supported by cross beams 9 secured to the base in a manner not shown in detail.

Figure 2:
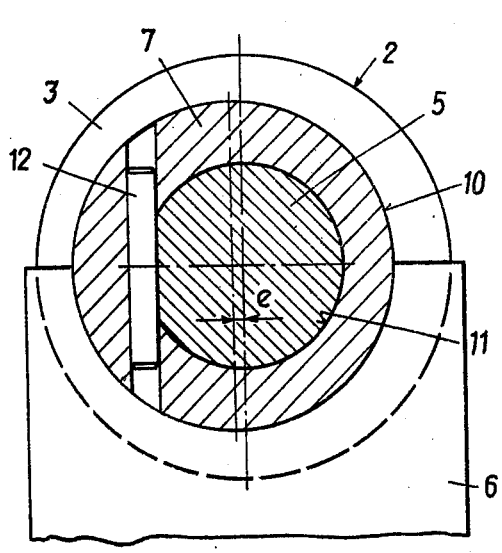
FIG. 2 is a view of the section along line II—II of FIG. 1.
Figure 3:
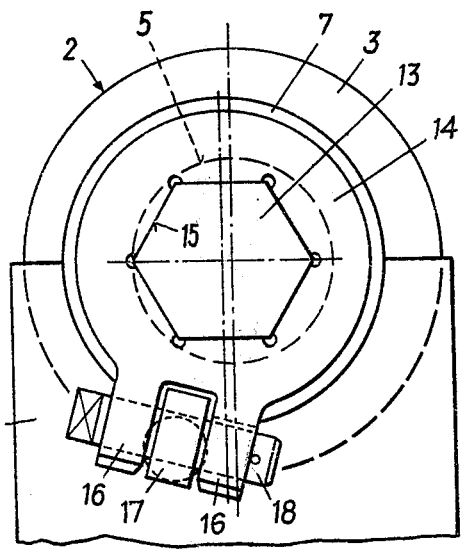
FIG. 3 is a view in the direction of the arrow III of FIG. 1, and FIGS. 4 to 6 show another embodiment of the strand guiding means of the invention in illustrations analogous to those in FIGS. 1 to 3, respectively.

In accordance with the embodiment shown in FIGS. 1 to 3, the eccentric bushings 7 have a circular cylindrical outer face 10. The axis-accommodating bore 11 is eccentrically displaced by the distance $e$ relative to the outer face 10, so that the roller can be moved by an amount $2e$ perpendicular to its axis by rotating its eccentric bushings. An adapter sleeve 12 penetrating the axis 5 and the eccentric bushing 7 secures the eccentric bushings against rotation about the axis, whereby solely the axis need be turned for the purpose of adjusting the roller; thus all of the eccentric bushings 7 tightly arranged on this axis are simultaneously turned with the axis. The ends of the axis are designed as regular hexagon prisms 13, each surrounded by an annular holding means 14 having a corresponding inner hexagon space 15, whereby the axis 5 is secured against rotation relative to the holding means 14. Instead of the prisms 13, cylindrical end portions of the axes can be provided for securing the axis against rotation, which cylindrical end portions are fixed on the holding means by clamping screws. Each holding means 14 has two straps 16 between which a nose 17 inserted in the roller carrier is placed. The holding means 14 is secured to the roller carriers 6 by means of a wedge 18 penetrating the two straps and the nose lying therebetween. The holding means may also have the form of a flange with edge bores slipped onto the ends of the axis, which flange is secured to the roller carriers by means of screws penetrating the edge bores.

For re-adjusting the position of the axis of a roller, the holding means 14, arranged at the two ends of the roller, are removed. Subsequently, the roller axis 5 is rotated by an angle of 60° or an integral multiple thereof, whereupon the holding means 14 are again slipped onto the axis and secured to the roller carriers by the wedges 18.

Figure 4:
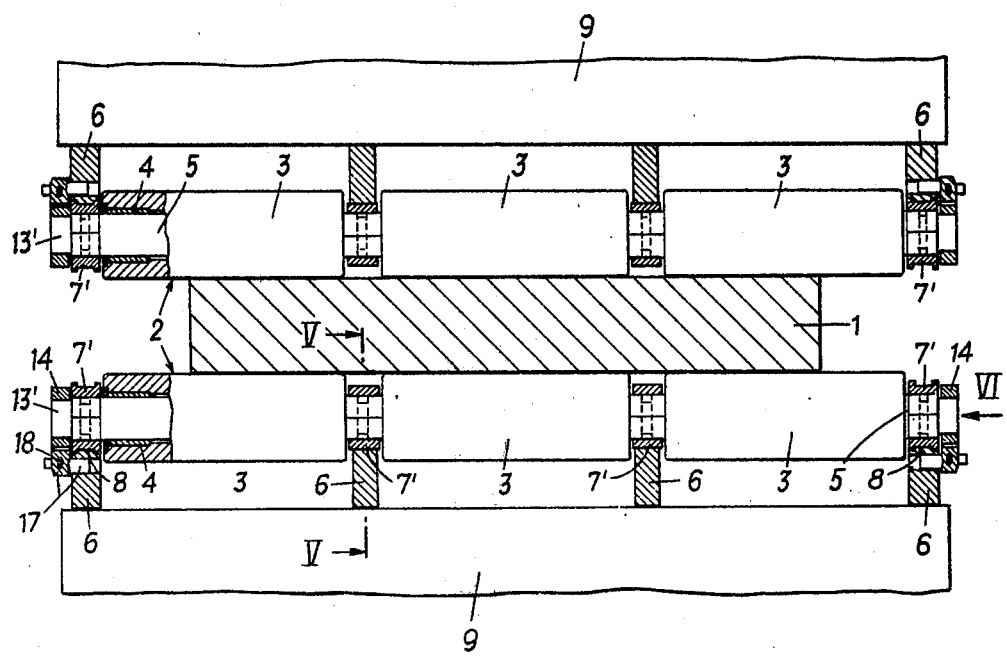
Figure 5:
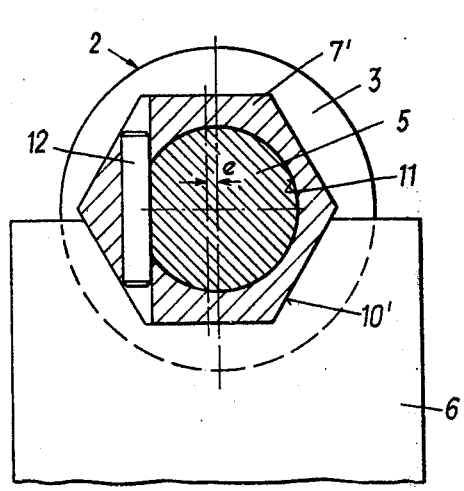
Figure 6:
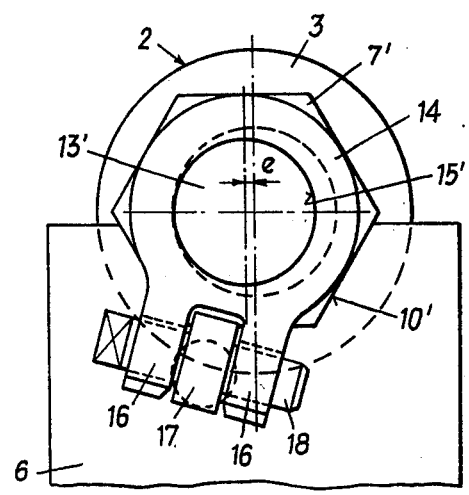

According to another embodiment, shown in FIGS. 4 to 6, the eccentric bushings 7' are designed as hexagon prisms with eccentrically arranged bores 11 accommodating the axis of the roller. The roller carriers 6 have recesses 10' corresponding to the hexagon prisms, into which recesses the eccentric bushings 7' are inserted. In this embodiment, the holding means 14 for the axes are slipped onto the circular cylindrical end portions 13' of the axis 5 with their circular cylindrical bore 15'.

For re-adjusting the position of its axis after having removed the holding means 14 the roller is moved out of the roller carrier 6 to such an extent that the eccentric bushings 7' can be rotated. After rotation about an angle that corresponds to the desired change in the position of the axis, the roller is re-inserted into the roller carriers 6 and secured thereto with the holding means 14.

Instead of the hexagon prisms, equilateral regular prisms having any desired number of sides may be used for both embodiments. The number of the sides depends upon the desired precise adjustability of the roller axes.

We claim:

1. In a continuous casting plant strand guiding means of the type including
    rollers arranged at a distance opposite one another to support and guide a cast strand, each roller having a plurality of roller bodies mounted on a roller shaft,
    roller carriers supporting said roller shafts, and
    holding means securing said roller shafts on said roller carriers so as to make them stationary, the improvement comprising:
    cylindrical cross sections on the ends of the roller shafts, said ends being retained in cylindrical bores of said holding means, said holding means having projections that are attachable to projections from the roller carriers adjacent the holding means;
    eccentric bushings mounting said roller shafts in said roller carriers, the eccentric bushings being formed with a prism-shaped outer configuration having a polygon-like cross section and eccentric bores to accommodate the roller shafts, the prism-shaped eccentric bushings being received in corresponding prism-shaped receiving pockets of the roller carriers;
    means securing the eccentric bushings against rotation relative to the roller shafts, the eccentric bushings being rotatable only upon release of the holding means to allow for incremental changes in the distance between rollers arranged opposite one another upon rotation of said eccentric bushings by rotation of said roller shafts.

2. A strand guiding means as set forth in claim 1, wherein the means securing the eccentric bushings against rotation relative to the roller shafts are adapter sleeves, each penetrating the respective eccentric bushing and the pertaining roller shaft along a line perpendicular to the roller shaft axis and located at the periphery of the roller shaft.

3. A strand guiding device for a continuous casting plant comprising:
    rollers arranged at a distance opposite one another to support and guide a cast strand, each roller having a plurality of roller bodies mounted on a roller shaft, the ends of the roller shaft having a prism-shaped outer configuration with a polygon-like cross section;
    a plurality of eccentric bushings mounted on the roller shafts at the ends of each roller body, said eccentric bushings being formed with a circular outer configuration and eccentric bores to accommodate the roller shafts;
    means securing the eccentric bushings against rotation relative to the roller shafts;
    roller carriers supporting the eccentric bushings on the frame of the casting plant, said carriers having circular receiving pockets corresponding to the outer configuration of the eccentric bushings for receiving the eccentric bushings;
    holding means secured on the ends of the roller shafts for rotation with said roller shafts, bores in the holding means having a prism-shape corresponding to the outer configuration of the ends of the roller shafts; and
    means releasably securing a projection on the holding means to a projection on the adjacent roller carriers so that said roller shafts can be made stationary, whereby upon release of said holding means from the roller carriers and the roller shafts the eccentric bushings can be rotated by the roller shafts in order to change incrementally the distance between the rollers arranged opposite one another.

4. A strand guiding means as set forth in claim 3, wherein the means securing the eccentric bushings against rotation relative to the roller shafts are adapter sleeves, each penetrating the respective eccentric bushing and the pertaining roller shaft along a line perpendicular to the roller shaft and located at the periphery of the roller shaft.

* * * * *